(12) United States Patent
Reimer et al.

(10) Patent No.: US 7,530,054 B2
(45) Date of Patent: May 5, 2009

(54) PROGRAM ANALYSIS TOOL PRESENTING OBJECT CONTAINMENT AND TEMPORAL FLOW INFORMATION

(75) Inventors: Darrell Christopher Reimer, Tarrytown, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 10/674,566

(22) Filed: Sep. 30, 2003

(65) Prior Publication Data

US 2005/0071813 A1 Mar. 31, 2005

(51) Int. Cl.
G06F 9/44 (2006.01)
(52) U.S. Cl. .................................................. 717/125
(58) Field of Classification Search ................ 717/124, 717/125, 131, 132, 133
See application file for complete search history.

(56) References Cited

U.S. PATENT DOCUMENTS

| | | | | |
|---|---|---|---|---|
| 6,026,362 | A * | 2/2000 | Kim et al. | 705/1 |
| 6,381,735 | B1 * | 4/2002 | Hunt | 717/158 |
| 6,769,095 | B1 * | 7/2004 | Brassard et al. | 715/513 |
| 6,807,583 | B2 * | 10/2004 | Hrischuk et al. | 719/318 |
| 6,961,925 | B2 * | 11/2005 | Callahan et al. | 717/128 |
| 6,965,902 | B1 * | 11/2005 | Ghatate | 707/103 R |
| 7,051,322 | B2 * | 5/2006 | Rioux | 717/143 |
| 7,099,809 | B2 * | 8/2006 | Dori | 703/6 |
| 2002/0100022 | A1 * | 7/2002 | Holzmann | 717/126 |
| 2002/0165997 | A1 * | 11/2002 | Hunsinger et al. | 709/318 |
| 2003/0037316 | A1 * | 2/2003 | Kodosky et al. | 717/127 |
| 2003/0041315 | A1 | 2/2003 | Bates | |
| 2003/0061600 | A1 | 3/2003 | Bates | |
| 2003/0120640 | A1 * | 6/2003 | Ohta et al. | 707/3 |
| 2004/0230954 | A1 * | 11/2004 | Dandoy | 717/124 |

OTHER PUBLICATIONS

Colberg, Christian; Kobourov, Stephen; Nagra, Jasvir; Pitts, Jacob; Wampler, Kevin; "A System for Graph-Based Visualization of the Evolution of Software", p. 77-86, ACM 2003, retrieved Jan. 3, 2007.*

Grundy, John; Hosking, John; "High-level Static and Dynamic Visualisation of Software Architecture", p. 5-12, IEEE 2000, retrieved on Jan. 3, 2007.*

(Continued)

*Primary Examiner*—Philip R. Wang
(74) *Attorney, Agent, or Firm*—Michael J. Buchenhorner; Douglas W. Cameron

(57) ABSTRACT

The present invention provides a method, apparatus, and computer instructions for program analysis. In an exemplary embodiment, a target program is loaded onto a data processing system including a program analysis software component. Hierarchies in the form of control flow and containment information about the target program are determined, using either static or dynamic, and direct (e.g., instrumented profilers) or indirect (e.g., monitored runtime), processing techniques, depending on the application and program analysis tool being used. The control flow and object containment information are then presented in a related and selected format for consideration by a user. One embodiment includes a program and GUI (graphical user interface) operably providing control flow-annotated object containment hierarchies to a user, the hierarchies including control flow, allocation and storage information added to object containment information.

12 Claims, 7 Drawing Sheets

OTHER PUBLICATIONS

Hermenegildo, Manuel; Puebla, German; "Incremental Analysis of Constraint Logic Programs", p. 187-223, ACM 2000; retrieved Jan. 3, 2007.*

Jerding, Dean F.; Stasko, John T; Ball, Thomas; "Visualizing Interactions in Program Executions", p. 360-370, ACM 1997, retrieved Jan. 3, 2007.*

Timothy Jacobs, "Interactive Visual Debuging With UML" Proceedings of the 2003 ACM Symposium on Software Visualization, pp. 115-122; ACM Press, New York, NY USA.

James A. Jones, "Visualization of Test Information to Assist Fault Localization" Proceedings of the 24th Intenational Conference on Software Engineering, Orlando, FL.A., pp. 467-477, Published 202, AMC Presss, NY, NY, USA.

Wanda Dann, "Making the Connection: Programming With Animated Small World" Proceedings of the 5th Annual SIGCSE/SIGCUE ITICSE Conf. on Innovation & Technology in Computer Science Education, pp. 41-44, Published 2000, ACM Press, New York, NY, USA.

Jean-Yves Vion-Dury, "Virtual Images: Interactive Visualization of Distributed Object-Oriented Systems" Proceedings of the Ninth Annual Conf. on Object-Oriented Programming Systems, Language, and Applications, pp. 65-84, Published 1994, ACM Press, New York, NY, USA.

* cited by examiner

FIG. 2

```
        220           210
10     public class A {           ←—232
20          public B b;
30          public D d;
40     }                           ←—234
50     public class B {
60             public C c;
70     }                           ←—236
80     public class C {
90          public D d;
100    }                           ←—238
110    public class D {
120    }
                                   ←—240
130    <entry>{
140    Foo foo = new Foo()
150    A a = foo.initializeA();    ←—244
160    B b=newB();
170    a.b=b;                      ←—248
180    D wrongD = new D();
190    a.d=wrongD;
200    foo.storeCin B(b);          ←—249
210    b.c.d=new D();

220    public class Foo{
230         public Foo(){ }        ←—242
240         public A initializeA(){return new A()};
250         public void storeCinB(B b){   ←—246
260              C c = new C();
270              b.c=c;
280         }
290    }
```

FIG. 3A (Prior Art)

A contains
    D    ←—332
    B contains
        ←—334
        C contains ←—336
            D ←—338

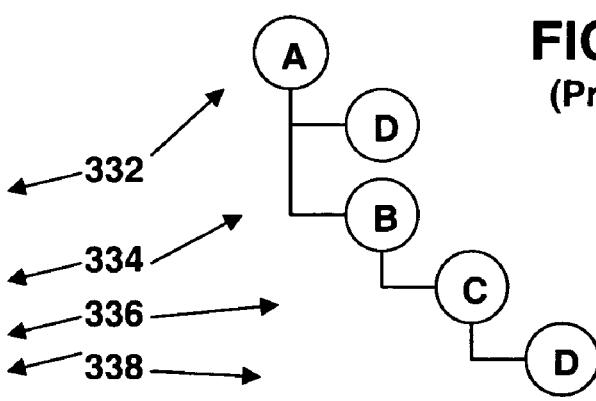

A contains *(created at line 240, allocation point reachable from program entry: <entry> calls Foo.initializeA())*. ← 442

D *(created at line 180, allocation point reachable from program entry: <entry> calls D.<init> )*. ← 448

B contains *(created at line 160, allocation point reachable from program entry: <entry> calls B.<init>)*. ← 444

C contains *(created at line 260, allocation point reachable from program entry: <entry> calls Foo.storeCinB(B))*. ← 446

D *(created at line 210, allocation point reachable from program entry: <entry> calls D.<init>)*. ← 449

FIG. 5

A contains *(created at line 240, allocation point reachable from program entry: <entry> calls Foo.initializeA())*. ← 540

D *(inserted into A from program entry: <entry> at line 190)*. ← 551

B contains *(inserted into A from program entry: entry at line 170)*. ← 552

C contains *(inserted into B from program entry: <entry> calls Foo.storeCinB(B) at line 270)*. ← 553

D *(inserted into C from program entry: <entry> at line 210)*. ← 549

PROGRAM ANALYSIS TOOL PRESENTING OBJECT CONTAINMENT AND TEMPORAL FLOW INFORMATION

TECHNICAL FIELD

The invention disclosed generally relates to computers and computer software. More specifically, the invention is generally related to program analysis tools.

BACKGROUND OF THE INVENTION

The increasing complexity of software programs has led to the development of a variety of tools to aid programmers and administrators in understanding the structure and functionality of their programs. Examples of these program analysis tools include debuggers, runtime execution visualizers, development environments and software quality tools. A debugger is a program that interactively traces the logic flow of a program and the contents of memory elements to locate, analyze, and correct bugs in another computer program. Runtime execution tools like profilers use processes like sampling or direct instrumentation to obtain a variety of runtime information, such as heavy memory allocation sites, CPU usage hot-spots, unnecessary object retention, and monitor contention, for a comprehensive performance analysis. A typical integrated development environment (IDE) includes a software application which provides software components to quickly prototype a new application.

A key problem with program analysis tools is how to present complex information about a program to an end user. While program understanding tools are valuable to software developers, testers and administrators in providing insights into the inner workings of what can be complex applications, current approaches for communicating this information are incomplete, often leaving the end-user an with insufficient understanding of the program.

In general, the current approaches to program analysis roughly fall into two groups: (1) the display of temporal flows of information through the program; and (2) the display of containment information, e.g., what objects contain or reference other objects. The most common method to display temporal flows is the sequential execution of events which occur from some start point to some end point. This type of explanation typically focuses on the call stack (i.e., which methods call what other methods). Containment information is typically presented in the form of object reference hierarchies (i.e., which objects refer to what other objects). FIGS. 3A and 3B illustrate one such approach via a textual (FIG. 3A) and graphical (FIG. 3B) object containment hierarchy for the illustrated program of FIG. 2.

For most program analysis processes, the information provided by just one of these two groups of hierarchical representations is of limited value. For example, when debugging a program by tracing through program statements, the user often finds that the program has entered an unexpected state, whether by a variable taking on an unexpected value or by a program executing code that should not have been reached. The chain of events causing the unexpected behavior may be difficult to uncover even with a slow, careful stepping through the program. In such a case, the user needs to resolve how the program arrived at a particular program statement or how a particular variable took on an unexpected value.

Similarly, when starting with object containment displays like FIGS. 3A and 3B, it becomes quickly apparent that certain key program events are missing from the display. Even in the case of the simple program of FIG. 2, these displays fail to show information that the D stored in A was created at a different program point than the D stored in C. For larger (more realistic) applications other information may also be important, such as how particular D got stored into this particular A from program entry points. Again, the object containment representation fails to give the user and adequate understanding of the program.

Thus, there is a need for a better understanding and presentation of information about the different hierarchies representing a program.

DISCLOSURE OF THE INVENTION

The present invention provides a method, apparatus, and computer instructions for program analysis. In an exemplary embodiment, a target program is loaded onto a data processing system including a program analysis software component. Hierarchies in the form of control flow and containment information about the target program are determined by processing of the program. This processing may be accomplished by static or dynamic, and direct (e.g., instrumented profilers) or indirect (e.g., monitored runtime), processing techniques, depending on the application and program analysis tool being used. The control flow and object containment information are then presented in a related and selected format for consideration by a user. One embodiment includes a program and GUI (graphical user interface) operably providing control flow-annotated object containment hierarchies to a user, the hierarchies including control flow, allocation and storage information added to object containment information.

BRIEF DESCRIPTION OF THE DRAWINGS

The novel features believed characteristic of the invention are set forth in the appended claims. However, the invention itself, together with certain objectives and advantages, may best be understood by reference to the following detailed description of an illustrative, presently preferred embodiment thereof, when read in conjunction with the accompanying drawings, of which:

FIG. 2 is an illustration of a software program with which a system in accordance with the invention can be advantageously used.

FIGS. 3A and 3B, respectively, illustrate textual and graphical object containment hierarchies, respectively, such as found in the prior art.

FIG. 4 illustrates an annotated object containment hierarchy according to an embodiment of the invention.

FIG. 5 illustrates another annotated object containment hierarchy according to an embodiment of the invention.

DESCRIPTION OF THE PREFERRED EMBODIMENT

Figure 1:
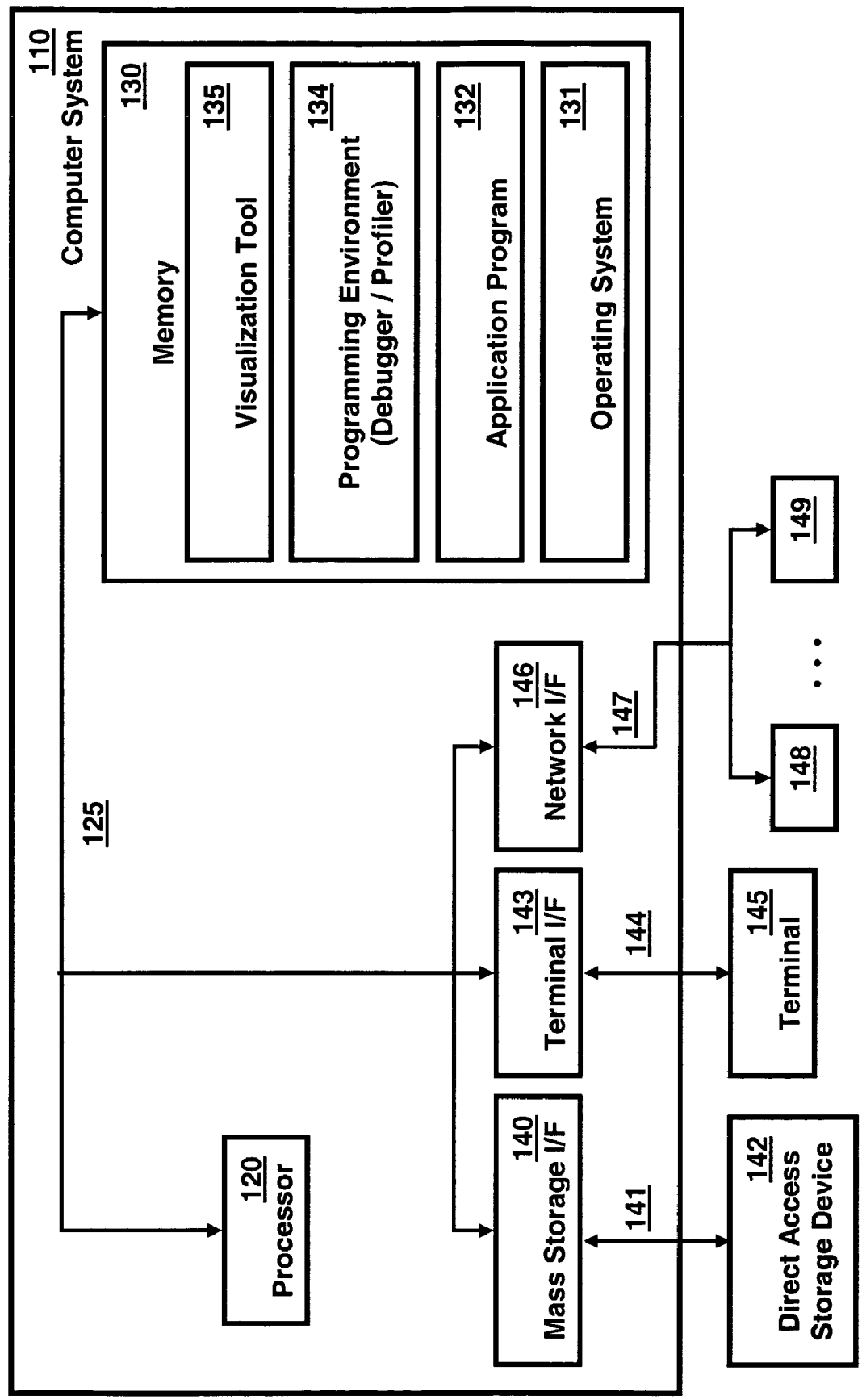
FIG. 1 is a block diagram of a computer system consistent with the invention.

With reference now to the figures and in particular with reference to FIG. 1, a pictorial representation of an information processing system in which the present invention may be implemented is depicted in accordance with certain presently preferred embodiments of the invention. In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

A particular information handling or processing system for implementing the present embodiments is described with reference to FIG. 1. However, those skilled in the art will appreciate that embodiments may be practiced with any variety of computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

In addition, various programs and devices described here may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Referring now to FIG. 1, a computer system 110 consistent with the invention is shown. For purposes of the invention, computer system 110 may represent any type of computer, information processing system or other programmable electronic device, including a client computer, a server computer, a portable computer, an embedded controller, a personal digital assistant, etc. The computer system 110 may be a standalone device or networked into a larger system. In one embodiment, the computer system 110 is an eServer iSeries OS/400 computer available from International Business Machines of Armonk, N.Y.

The computer system 110 could include a number of operators and peripheral systems as shown, for example, by a mass storage interface 140 operably connected to a direct access storage device 142 via high speed bus interface 141, by a video interface 143 operably connected to a display 145, and by a network interface 146 operably connected to a plurality of networked devices 148 . . . 149. The display 145 may be any video output device for outputting a user interface. The networked devices 148-149 could be desktop or PC-based computers, workstations, network terminals, or other networked information handling systems, connected by any one of a variety of networking systems including a local area network (LAN) 147, personal area network (PAN), or wide area network (WAN).

Computer system 110 is shown with a system environment that includes at least one processor 120, which obtains instructions or operation codes (also known as opcodes) and data via a bus 115 from a main memory 130. The processor 120 could be any processor adapted to support the debugging methods, apparatus and article of manufacture of the invention. In particular, the computer processor 120 is selected to support monitoring of memory accesses according to user-issued commands. Illustratively, the processor is a PowerPC available from International Business Machines of Armonk, N.Y.

The main memory 130 could be one or a combination of memory devices, including random access memory, nonvolatile or backup memory (e.g., programmable or flash memories, read-only memories, etc.). In addition, memory 130 may be considered to include memory physically located elsewhere in a computer system 110, for example, any storage capacity used as virtual memory or stored on a mass storage device or on another computer coupled to the computer system 110 via bus 115.

The main memory 130 includes an operating system 131, a computer program 132 (the target program to be debugged or profiled), and a programming analysis tool 134. The program analysis tool 134 includes any of a class of programs that perform program understanding (e.g., a debugger, runtime tracers or profilers, or quality analyzer), static analyzers, or other programs or development environments of the type operable for analyzing hierarchies of the target program 132. These are generally implemented in software, but can be implemented in a combination of hardware (firmware) and software. A visualization tool 135 may be integrated as part of the program analysis tool 134, or be configured to receive data relating to program 132 from program analysis tool 134. Although illustrated as integral programs, one or more of the foregoing may exist separately in the computer system 110, and may include additional components not described. Processor 120 implements the processes illustrated using computer implemented instructions, which may be located in a memory such as, for example, main memory 130, memory 142, or in one or more peripheral devices 148-149.

An exemplary source code 210 for program 132 is shown in FIG. 2 (written in Java™ software language. Java™ is a trademark of Sun Microsystems, Inc.). In this example, source code 210 includes line numbers 220, class declarations for public classes A-D (232-238, respectively), and object creation points 242-248 for objects A-D, respectively. The Individual objects B-D are nested, such that particular object A holds particular objects B and D, particular object B holds C, and C in turn holds a specific D.

FIGS. 3A and 3B illustrate textual and graphical object containment hierarchies, respectively. An object containment hierarchy is frequently used to explore issues about memory utilization of a program, because an object containment hierarchy is a description of how objects refer to other objects. However, this form of presentation is often of limited value to program understanding for complex programs, since all it presents is the containment hierarchy of objects A-D (332-338, respectively). Often, a user needs information that combines temporal flow type information with containment or memory creation information to understand a program, or correct an error in the program. Current techniques, like those of FIGS. 3A and 3B, have well-known ways to present either temporal flow or containment information in isolation, but fail to unify these types of information in presenting the information to the user. As a result, several key pieces of information are unavailable to the user wanting a deeper understanding of program 132.

A better way to display program hierarchy information, according to a first embodiment of the invention, is shown in FIG. 4. In addition to the object containment information 332-338 of FIG. 3A, annotation information is included which has control flow and object creation information. For example, the information that is displayed to the user may be of the form of FIG. 4, where the annotated information 442-449 is in italics. This annotation information 442-449 corresponds to object creation code 242-249, respectively. Unlike a simple object containment graph, information is now readily apparent showing the different creation information for object D at 448 and 449 (corresponding to lines 180 and 210 of program 220). The annotated information can also be distinguished by any other convenient means, such as bracketing or the use of different colors to represent different hierarchy information types.

It may also be important in some reviews to understand how objects are stored in other objects from program entry points. FIG. 5 illustrates such a presentation combined with the object containment and control flow hierarchy information. Again, the annotated information is presented in italics. While the insertion of object D into C (549) occurs at the same line 210 as the creation of object D (contained in C), the insertion of D into A, B into A and C into B (551-553 respectively), occur at different lines than the creation of the objects B through D. Thus, a usefully different view of program events is yielded by a review of this combination of temporal and containment hierarchy information than that presented by FIG. 4.

In a general sense, both FIGS. 4 and 5 provide a means for reporting certain key events in the execution of a program where, in describing a path between the nodes of the hierarchy from a source node to destination node, the events themselves are not nodes of the hierarchy in question, but nevertheless, they perform critical operations that are necessary for understanding the path from the source to the destination node. That is, for the transition between nodes to occur, it is necessary for the program state to be in a certain configuration, and without the proper state, the transition from source node to destination node cannot occur. Events contributing to the state of the program are not bound to occur between the source and destination node, so they will not always show up in a simple representation of the transition from a source node to a destination node.

These key events would be omitted by typical prior art presentations. By adding these key events (i.e., which are not nodes of the hierarchy in question, but are nodes of other related hierarchies), it is possible for the end user to achieve a deeper understanding of the program than is possible from display of the individual hierarchies in isolation. It is possible to represent both hierarchies as a single combined hierarchy, bringing together disparate views such as those of control flow graphs, invocation graphs, object creation graphs, object reference graphs, and/or data dependence graphs. A user may choose instead to focus on a subset, such as in the cases shown for FIGS. 4 and 5.

Figure 6:
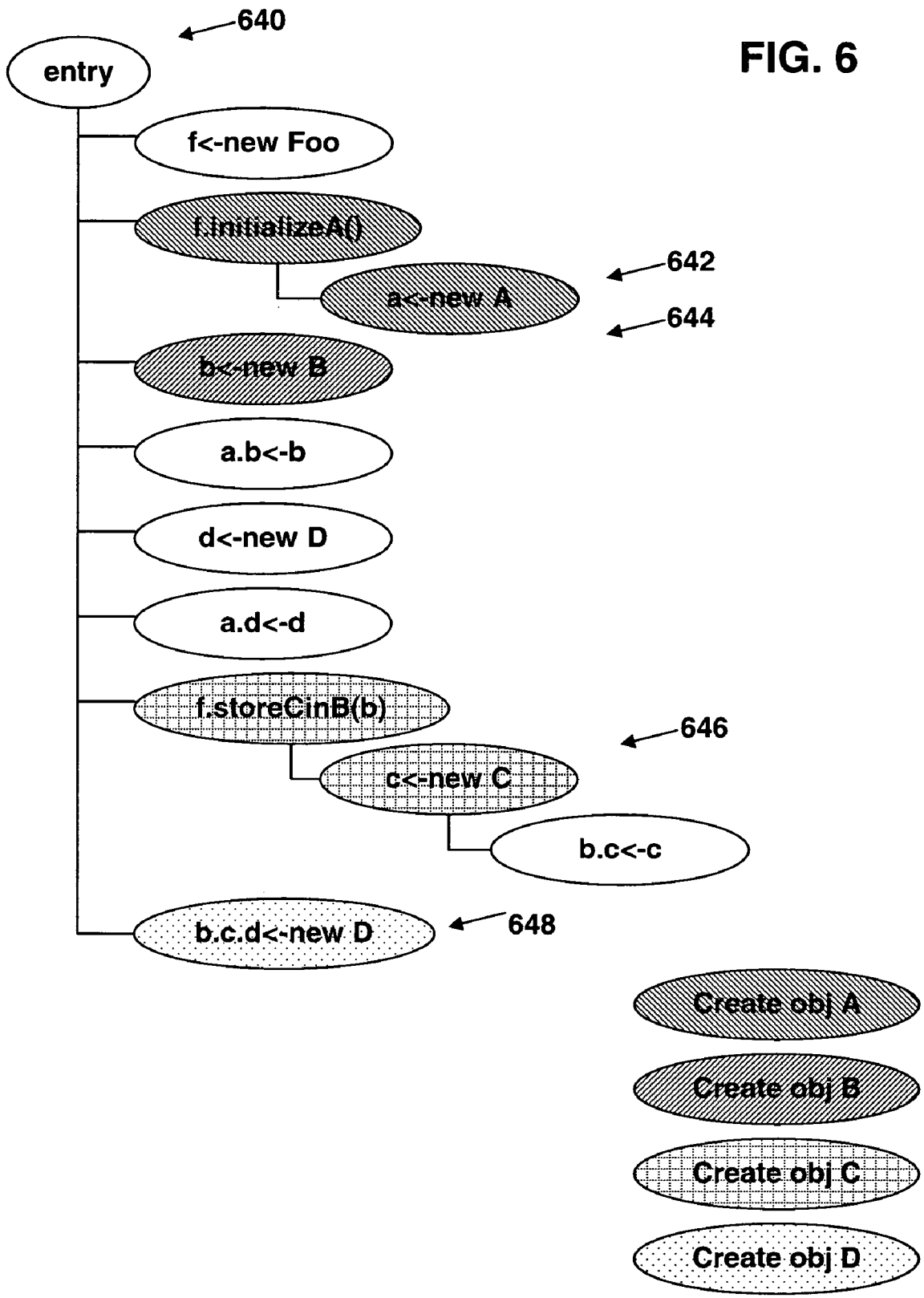
FIG. 6 illustrates a combined object containment and control flow graph according to an embodiment of the invention.
Figure 7:
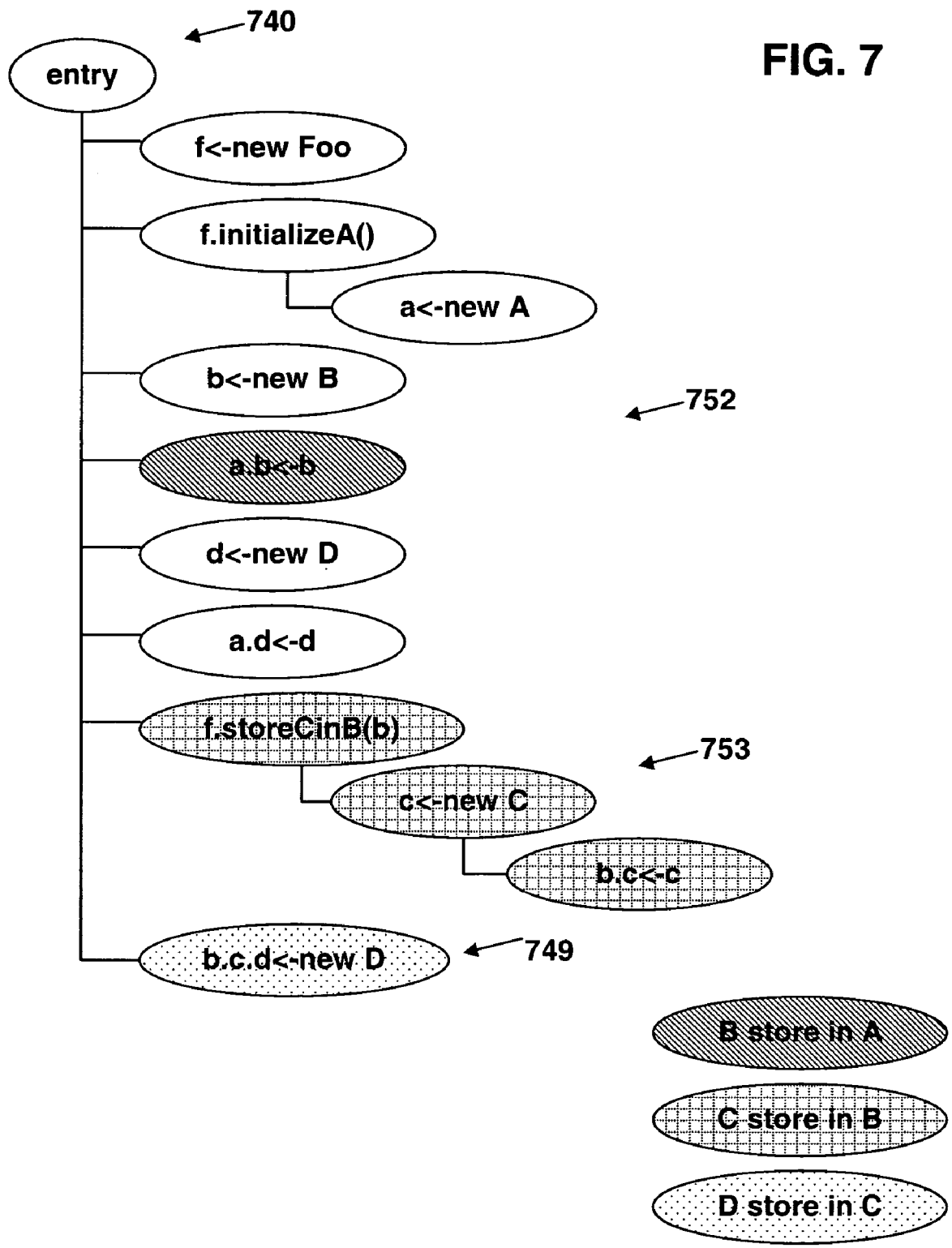
FIG. 7 illustrates another combined object containment and control flow graph according to an embodiment of the invention.

FIGS. 6 and 7 illustrate how different events in a program contribute and are necessary for the transition from a source node to a destination node. A simple object containment graph, such as FIG. 3B, only shows that object D is indirectly stored into A, through B and C. This is of limited value since it explains nothing about how these objects are created and how they build references to each other. To obtain such additional information, control flow information is needed to show the ordering and relationship between the different method calls in the program's execution.

In the annotated control flow graph of FIG. 6, each node represents a method invocation or a field assignment in the program's execution. Ordering is implied, with earlier events at the top of the graph and later events at the bottom of the graph. This control flow information is useful, but insufficient to show which events contributed to the ability to make the transition from program entry to the indirect store of D into A. The events in the control flow graph which are of interest in explaining how D was indirectly stored in A include how the objects in the hierarchy between A and D were created (the allocation points 642-648 of FIG. 6) and how the objects between A and D were stored into each other (the storage points). By adding such as annotation information, this graph can now show all the events related to the creation of an object necessary to make the transition from the program entry to the store of D into A indirectly through B and C.

However, FIG. 6 is still missing information necessary to fully explain this program transition. This missing information concerns the events relating to how each of the objects between A and D are stored into each other. FIG. 7 illustrates just such an annotated graph, showing storage events 749-753 in annotated form.

The combination of the events in the object containment hierarchy of FIG. 3 (how D could be stored in A), the annotated allocation graph of FIG. 6 (how the objects A, B, C, and D related to this problem were created), the annotated storage graph of FIG. 7 (how D was stored in A indirectly through B and C), and the control flow information (what was the path of method executions between program entry and the store of D in A) illustrate all the events necessary for an understanding of how the transition from source node (program entry) to destination node (store of D in A indirectly through B and C) occurred. While this has been shown in the case of a relatively simple example, it is just as (if not more) applicable in large or even typical programs, as the information necessary for program understanding could be buried in thousands or even millions of program execution events.

Figure 8:
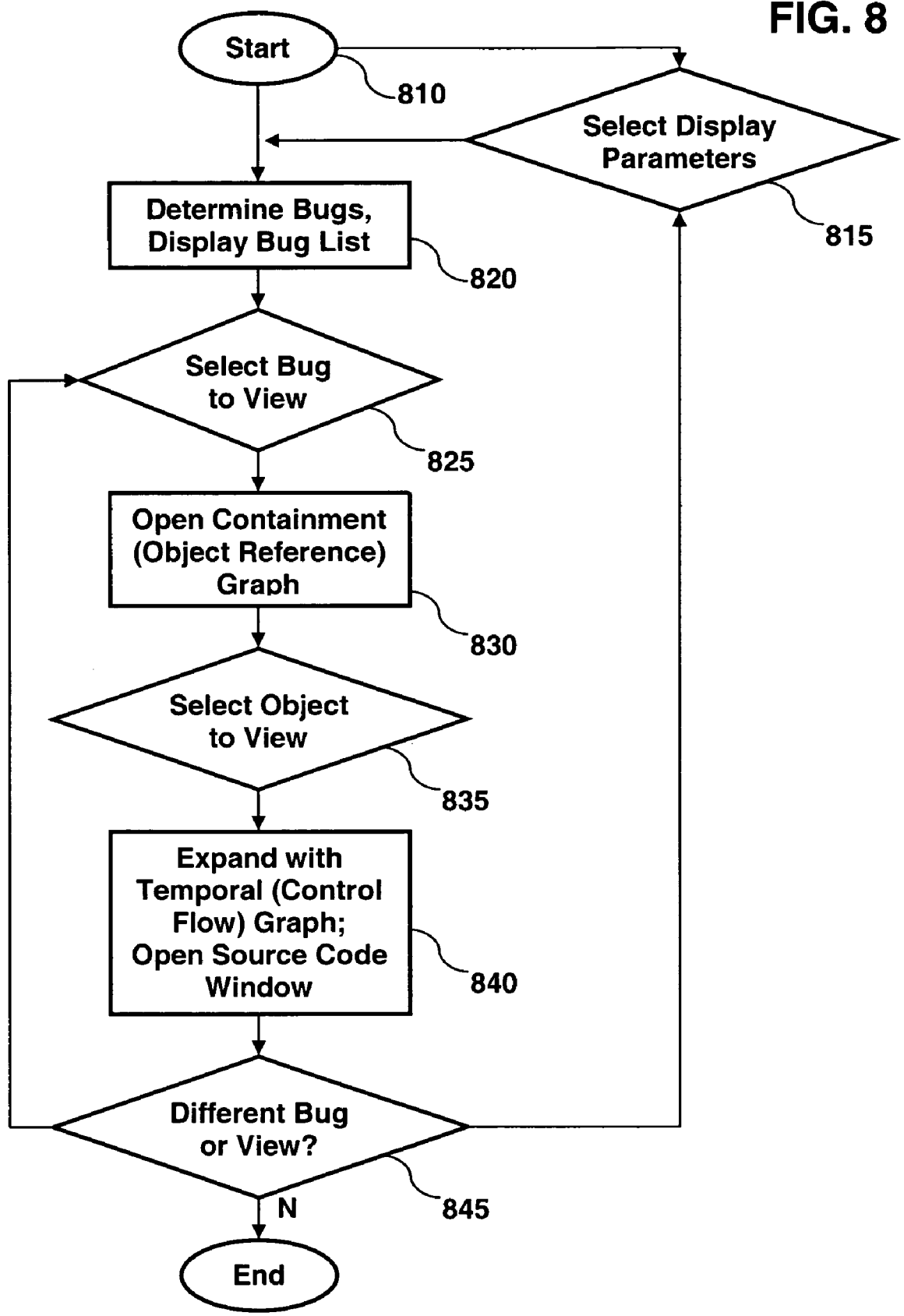
FIG. 8 illustrates a flow chart of the method for presenting information of interest to a user according to an embodiment of the invention.

The flow chart of FIG. 8 further illustrates an embodiment of the invention in connection with a typical debugging program, such as program 134 of FIG. 1. A debugging process is initiated by a debug user interface, which allows a user to set control points and variable values by inputting the appropriate commands. During execution, control is returned to the debugger 134 via a debug hook, a code segment that returns control to the appropriate user interface. The debugger 134 utilizes a control flow graph to trace program statement(s) that may have been executed prior to the halted program statement, and an object reference graph contains a representation of which objects refer to which other objects. These and other temporal and/or containment hierarchy information are constructed during the compilation of computer program 132 by a compiler (not shown) known in the art.

In some implementations, execution of the program eventually results in an event causing a trap to fire (e.g., a breakpoint is encountered). Control is then returned to the debugger 134 by the debug hook and program execution is halted. The debug hook then invokes the debug user interface and may pass the results to the user interface. Alternatively, the results may be passed to a results buffer to cache data for the user interface. In other embodiments, the user may input a command while the program is stopped causing the debugger 134 to run a desired debugging routine. Result values are then provided to the user via the user interface.

Once control is returned to the debug user interface, it displays a list of bugs in a first window and/or highlights the current line of the program on which a stop or error occurs (step 820). The user selects a particular bug to investigate by any convenient selection means, common selection methods including clicking on a graphical representation of the selected bug or entering a value (step 825). In response, containment information in the form of an object reference graph is displayed (step 830). In the preferred application, by clicking on the selected bug, a hierarchy is returned of the objects up to the root object in a second, hierarchy presentation window.

Next, the user selects an object to view by clicking on the desired object (step 835). This causes temporal flow information, such as control flow, to be returned and displayed in the hierarchy presentation window (step 840). The information returned may be of the form of either FIG. 4 or 5, a textual annotated containment hierarchy, or other selected representation of combined temporal and containment hierarchies (for example, aural representations for the visually impaired). Preferably some form of user selection will be provided via an appropriate menu or set of user prompts by which any user who wants other than a given default presentation to set the parameters that determine which temporal flow and containment hierarchy representations are returned, along with other settings such as the level of detail, order and manner of presentation (step 815).

Figure 9:
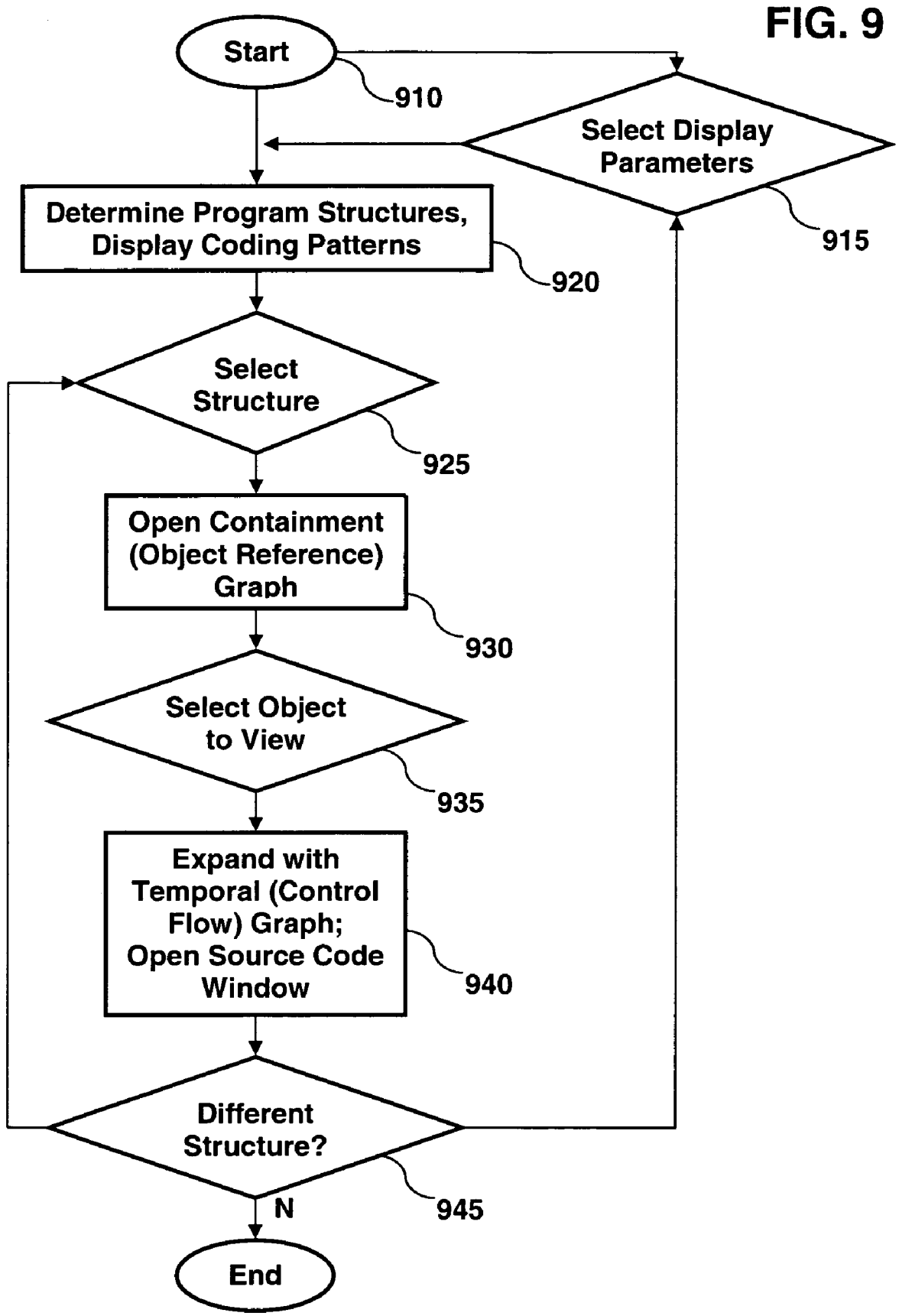
FIG. 9 illustrates a flow chart of the method for presenting information of interest to a user according to a further embodiment of the invention.

Turning now to FIG. 9, the operation of an embodiment using a static analysis tool is illustrated. As with the process for debugging shown in FIG. 8, this process may begin by using preset parameters, or allowing the user to set operating parameters for the analysis (step 915). These parameters may include any particular pattern of interest, such as a misuse of resources (e.g., for database, files, sockets), memory leaks, race conditions, write to shared state, and the like. If debugging, these may be determined around the most common problematic bugs. If profiling, common coding patterns that lead to operational inefficiencies may be set as the priority patterns to review. The priority for processing and display will vary by application and tool, and may be domain-specific and further modified based on empirical data such as the frequency of user reported issues. One skilled in the art will readily understand how to set appropriate default parameters, as well as how to adjust parameters as desired to optimize the tool for a specific program and system environment.

Next, after initiation the static analysis tool processes the application based on an analysis of the application structures in view of the preset patterns of interest. The priority patterns of interest are returned and presented to the user (step 920). The user selects a particular pattern to investigate (e.g., a memory block) by any convenient selection means (step 925), and containment information in the form of an object reference graph is displayed (step 930). In the preferred application, by clicking on the selected structure (e.g., an object, control flow, memory, bug), a hierarchy is returned of the objects up to the root object in a second, hierarchy presentation window.

Next, the user selects an object to view by clicking on the desired object (step 935). This causes temporal flow information, such as control flow, to be returned and displayed in the hierarchy presentation window (step 940). After exploring the coding pattern via the temporal flow and containment information and source code information, the user may chose to view a different structure, reset the program parameters, or end the session (step 945).

Thus, the present invention provides an improved program analysis tool by which temporal flow and containment information may be combined to provide a user with greater insight into a target program. The information may be combined into a single hierarchy, or presented as a series of related hierarchies, with the particular temporal flow information and particular containment information being a matter for selection by a user or designer of the program analysis tool.

Of course, one skilled in the art will appreciate how a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include recordable-type media, such as a floppy disk, a hard disk drive, a RAM, CD-ROMs, DYD-ROMs, and transmission-type media, such as digital and analog communications links, wired or wireless communications links using transmission forms, such as, for example, radio frequency and light wave transmissions. The signal bearing media may take the form of coded formats that are decoded for actual use in a particular data processing system. Moreover, while the depicted embodiment includes an example in a Java™ software language environment, the processes of the present invention may be applied to other programming languages and environments.

In conclusion, the above description has been presented for purposes of illustration and description of an embodiment of the invention, but is not intended to be exhaustive or limited to the form disclosed. This embodiment was chosen and described in order to explain the principles of the invention, show its practical application, and to enable those of ordinary skill in the art to understand how to make and use the invention. Many modifications and variations will be apparent to those of ordinary skill in the art. Thus, it should be understood that the invention is not limited to the embodiments described above, but should be interpreted within the full spirit and scope of the appended claims.

What is claimed is:

1. A method comprising steps of:

loading a computer program onto an information processing system;

analyzing a certain key event in an execution of the program by analyzing node transition from source nodes to destination nodes in nodes associated with the certain key event, wherein each associated node represents an object comprising a method invocation or a field assignment in the execution;

generating an object containment hierarchy of relationships between the associated nodes of the computer program using a program analysis tool, wherein the object containment hierarchy comprises a description of how each of the objects between the source node and the destination node are stored into each other; wherein ordering is implied, with earlier events at a top of the hierarchy and later events at a bottom of the hierarchy;

generating a temporal flow hierarchy using the program analysis tool, wherein the temporal flow hierarchy comprises control flow and node creation information, linking events contributing to a state of the program during the node transition and describing said events; wherein at least some of the events are not referenced in the object containment hierarchy;

wherein ordering is implied in both hierarchies, with earlier events at the top of the hierarchy and later events at the bottom of the hierarchy;

expanding the object containment hierarchy by appending the temporal flow hierarchy in a form of annotations, such that the annotations are linked with the associated nodes which they describe, to form an annotated object containment hierarchy; wherein the annotations are appended such that said annotations are distinguishable from the object containment graph; and presenting at least a portion of the annotated object containment hierarchy in response to a user request.

2. The method of claim 1 wherein the annotated object containment hierarchy is formed as a single hierarchy.

3. The method of claim 1 wherein the annotated object containment hierarchy is formed as a series of related hierarchies.

4. The method of claim 1 wherein the program analysis tool comprises a tool selected from a group consisting of: a debugger, a runtime tracer, a profiler, a quality analyzer, and a static analyzer.

5. The method of claim 4 wherein a visualization tool is integrated as part of the program analysis tool.

6. The method of claim 4 wherein a visualization tool is configured to receive data relating to the computer program from the program analysis tool.

7. The method of claim 1 wherein the presenting step comprises displaying at least one selected from a group consisting of: a control flow graph, an invocation graph, an object creation graph, an object reference graph, and a data dependence graph.

8. The method of claim 1 wherein the presenting step comprises:

presenting the object containment hierarchy in response to the user request;

receiving a selection of a node from the user; and presenting at least a portion of the annotated object containment hierarchy, displaying annotations from a perspective of the selected node, responsive to the user selection.

9. The method of claim 8 wherein the second presenting step comprises presenting the annotations in italics.

10. The method of claim 8 wherein the second presenting step comprises presenting the annotations in brackets.

11. The method of claim 8 wherein the receiving step comprises receiving a click on an icon representing the node.

12. The method of claim 8 wherein the receiving step comprises receiving textual input from the user.

* * * * *